J. R. BOWLES.
TIRE CHAIN HOLDER.
APPLICATION FILED MAY 2, 1917.
1,253,926.
Patented Jan. 15, 1918.
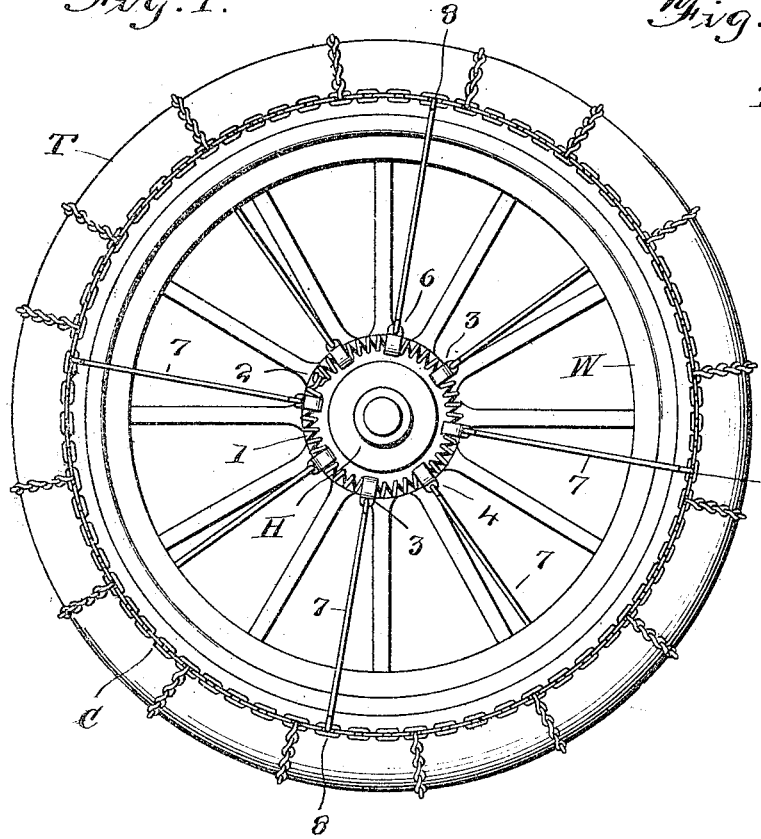
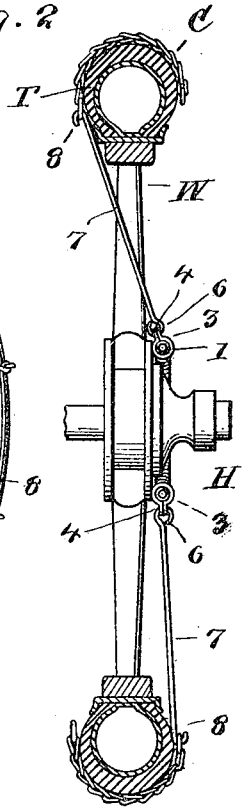
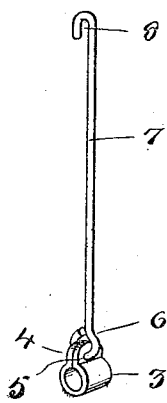
WITNESSES
INVENTOR
J. R. Bowles
BY Victor J. Evans
ATTORNEY

UNITED STATES PATENT OFFICE.

JOSEPH R. BOWLES, OF LYNCHBURG, VIRGINIA.

TIRE-CHAIN HOLDER.

1,253,926.  Specification of Letters Patent.  Patented Jan. 15, 1918.

Application filed May 2, 1917. Serial No. 166,015.

*To all whom it may concern:*

Be it known that I, JOSEPH R. BOWLES, a citizen of the United States, residing at Lynchburg, in the county of Campbell and State of Virginia, have invented new and useful Improvements in Tire-Chain Holders, of which the following is a specification.

This invention relates to devices for holding the ordinary anti-skid chain on an automobile wheel; and the object of the same is to produce a holder which is so constructed and applied that in case the chain breaks or in case the holder should break, the driver is informed of the fact immediately and is therefore given an opportunity to make the proper repairs at once, rather than suffering the entire loss of the chain and its attachment, as is the case with most of the devices now on the market.

A further object is to produce a holder of this type which is applicable to and useful in connection with nearly all of the popular tire chains now in use, and which combines the features of simplicity, reliability, adaptability, and the ease of application and removal.

Other objects will appear in the following specification, reference being had to the accompanying drawings wherein:—

Figure 1 is a side elevation of an automobile wheel equipped with a tire chain held in place by one of these improved devices.

Fig. 2 is a transverse sectional view through the same.

Fig. 3 is a perspective view of one of the holding links, and the collar at its inner end for attachment to the spring.

In the drawings the letter W designates the automobile wheel having a hub H and a tire T, and C is the ordinary tire chain surrounding said tire, and held thereon as is usual by connecting its extremities with each other through means not necessary to illustrate in detail herein.

Coming now to the details of the present invention, the numeral 1 designates a spring ring, so called because it is annular in contour or substantially so before tension is thrown onto it as described below. This ring I make of spring wire coiled into a long helix and bent into the shape of a ring with its extremities connected with each other as at 2, permanently or otherwise as desired, and in diameter the ring is about six inches more or less. Slidably mounted on this spring ring are several collars 3, herein shown as eight in number, although I do not wish to be limited in this respect; and each collar is preferably in the shape of a clip made from a piece of strip metal whose center is bent into an annular element or collar loosely surrounding the coil and whose ends constitute ears 4 which are pierced with registering perforations 5. Through the latter, when the ears are drawn together, passes an eye 6 at the inner end of a link 7 which by preference is a short stretch of rod. At the outer end thereof, I provide a hook 8 or other fastening means adapted to engage with one of the links of the tire chain C. While this device may be made in sizes to fit automobile wheels of different sizes, if the spring ring be of sufficient flexibility and elasticity it is quite possible to use the device on automobile wheels of all the common makes and sizes.

In use the chain C is applied to the tire T and its ends fastened to each other in the ordinary manner, after which one of these holders is brought into position at one side of the wheel W and its spring ring 1 caused to inclose the hub about as shown in Fig. 1. The hooks at the outer ends of alternate links are then engaged with points in the chain where the latter stands alongside the rim, and if there are eight such hooks in the series and four of them were so used, the points would be correspondingly spaced around the wheel. The remaining links are now properly adjusted so that the hooks at their outer ends may be engaged with four corresponding points in the chain at the other side of the wheel-rim, and in order to accomplish this engagement said remaining links will have their collars slid along on the spring ring until they are disposed intermediately between the collars of the first four links, and then the bodies of the remaining links themselves will be passed between the spokes of the wheel in a manner which will be clear. It is of course possible to employ more or less of the links than shown in the drawings, but four pair are usually all that are necessary. After adjusting each collar on the spring ring to the desired point, the link is grasped in the hand of the operator and its hooked outer end is drawn radially outward away from the hub H until it can be engaged with the chain, the elasticity or resiliency of the spring ring 1 permitting it to yield sufficiently to allow such engagement. This is continued around one side of the wheel, after which the same operation is continued around the other side of the wheel excepting that each link must be passed between the spokes before its hook can be engaged with the chain in the manner suggested above. It is quite possible to make every other link slightly longer than those which intervene, and these longer links will be the ones which are passed between the spokes. The purpose is obvious. With such arrangement the spring ring would, by the length of the series of shorter links, be held around the hub and be slightly remote from one side of the spokes so that the paint would not become marred or scratched, and the length of the intermediate links would permit them to reach from the spring ring obliquely through the wheel to the other side of the chain without necessarily drawing the spring ring against the spokes.

When the device is finally in place, the tension of the spring ring draws all links radially inward and these of course draw the connecting points of the tire chain C radially inward and bear such chain firmly against the tire T. The driver now proceeds on his way, and if through any accident the chain should break, instead of simply running out of it and leaving it on the road as heretofore, it is reliably held upon the wheel by this improved holder while its free or loosened ends fly outward under centrifugal force and strike beneath the fender at each revolution of the wheel. Thereby the driver is given audible notice of the breakage of the chain, and can stop and make the necessary repairs. If it should so happen that the holder itself becomes broken in any of its parts, there are enough remaining in connection with the chain to prevent the loss of the holder, and the holder itself where it is loose will fly outward and strike the fender and give notice as above. It is extremely unlikely that both the chain and the holder will become broken at the same time, and therefore it is almost safe to say that under no condition could this chain and holder be lost off the wheel without the driver having had warning. When not in use the device is removed with the tire chain and laid away in the tool box.

What is claimed as new is:—

1. The herein described holder for tire chains and the like, the same comprising a ring of coiled spring wire adapted to loosely surround the hub of an automobile wheel, a series of collars adjustably embracing said ring and each having a perforated ear, and a series of links, each having an eye at its inner end permanently but loosely engaging one of said ears and a hook at its outer end adapted to be attached to the chain, the links being alternately long and short and of such average length that the spring ring is put under tension when their hooks are engaged with the chain as described.

2. The herein described holder for tire chains and the like, the same comprising a spring ring adapted to surround the hub of the wheel, a series of collars adjustably embracing said ring, and two series of links, each of which links is connected at its inner end to one of the said collars and has a hook at its outer end, the links of one series being adapted to be connected to the chain at one side of the wheel and those of the other series being adapted to be passed between the spokes and attached to the chain at the other side of the wheel.

In testimony whereof I affix my signature.

JOSEPH R. BOWLES.